United States Patent [19]

Umemura

[11] Patent Number: 5,277,282
[45] Date of Patent: Jan. 11, 1994

[54] ROTARY OIL DAMPER

[75] Inventor: Haruyuki Umemura, Chigasaki, Japan

[73] Assignee: Kato Hatsujo Kaisha, Ltd., Kanagawa, Japan

[21] Appl. No.: 963,710

[22] Filed: Oct. 20, 1992

[51] Int. Cl.⁵ .................. F16F 9/52; F16D 57/00
[52] U.S. Cl. .................. 188/290; 188/293; 74/573 F; 16/85
[58] Field of Search ............ 188/290, 293, 294, 307; 16/54, 69, 84, 85; 74/572, 573.F; 74/574

[56] References Cited

U.S. PATENT DOCUMENTS

| | | | |
|---|---|---|---|
| 4,550,470 | 11/1985 | Omata | 16/85 |
| 4,565,266 | 1/1986 | Omata | 188/290 X |
| 4,571,773 | 2/1986 | Yuda | 16/85 |
| 4,576,252 | 3/1986 | Omata | 188/290 X |
| 4,614,004 | 9/1986 | Oshida | 188/290 X |
| 4,691,811 | 9/1987 | Arakawa et al. | 188/290 |
| 4,697,673 | 10/1987 | Omata | 188/290 X |
| 4,830,151 | 5/1989 | Numata | 16/85 X |
| 5,152,189 | 10/1992 | Miura et al. | 74/573 F |
| 5,211,267 | 5/1993 | Clark | 192/82 X |

FOREIGN PATENT DOCUMENTS

| | | | |
|---|---|---|---|
| 3463420 | 5/1951 | Italy | 16/85 |
| 52-14053 | 2/1977 | Japan | 16/69 |
| 57-49216 | 10/1982 | Japan . | |
| 59-88548 | 6/1984 | Japan . | |
| 60-249743 | 12/1985 | Japan | 188/290 |
| 63-196258 | 8/1988 | Japan . | |
| 4-285336 | 10/1992 | Japan | 188/293 |
| 2253891 | 9/1992 | United Kingdom | 188/293 |

Primary Examiner—Rodney H. Bonck
Assistant Examiner—Ryan W. Massey
Attorney, Agent, or Firm—Wenderoth, Lind & Ponack

[57] ABSTRACT

A rotary oil damper includes a housing incorporating therein a storing chamber open on one side, a cap having a hole and for shutting the opening in the storing chamber of the housing, a rotor including a base part and a shaft part and disposed rotatably inside the storing chamber of the housing, a toothed wheel fixed to the shaft part of the rotor, viscous oil filling said storing chamber of the housing, and a ring-shaped leaf spring member having opposite terminal parts separated from each other and contained in conjunction with the rotor inside the storing chamber. The shaft part of the rotor protrudes outwardly through the hole of the cap. With one of the opposite terminal parts of the spring member fixed to the base part of the rotor, the spring member moves along the inner wall surface of the storing chamber through a membranous layer of the viscous oil formed between the inner wall surface of the storing chamber and the peripheral surface of the spring member synchronously with the normal or reverse rotation of the rotor within the storing chamber.

4 Claims, 3 Drawing Sheets

ROTARY OIL DAMPER

BACKGROUND OF THE INVENTION

1. Field of the Invention

This invention relates to a rotary oil damper to be used in a push-open type member such as, for example, an ashtray in an automobile or an opening-shutting lid in a household electric appliance which is constantly urged in the opening direction for the purpose of braking the speed at which the push-open type member is opened.

2. Description of the Prior Art

This type of conventional oil damper is generally provided, as disclosed in Japanese Utility Model Public Disclosure No. 59-88548, with a housing incorporating therein a storing chamber open on one lateral side, a cap for shutting the opening in the storing chamber of the housing, a rotor disposed rotatably in the storing chamber of the housing, and a toothed wheel fixed to the leading end of a shaft of the rotor protruding outwardly through a cap hole. The storing chamber of the housing is filled with viscous oil such as silicone oil in conjunction with the rotor.

The application of this oil damper to the aforementioned push-open type ashtray in an automobile is accomplished by fixing the housing of the oil damper to either of the case of the ashtray and the frame retaining the ashtray case in an emerging-submerging manner, providing the remainder of the two components just mentioned with a rack, and allowing the toothed wheel on the damper side to be meshed with the rack as disclosed in Japanese Patent Public Disclosure No. 63-196258. As a result, the ashtray case tends to move in the opening direction by virtue of the resilient pressure and, in consequence of this motion of the ashtray case, the rotor rotates in spite of the viscous resistance of the oil inside the storing chamber of the housing. Thus, the opening speed of the ashtray case is braked and the ashtray case is enable to move slowly in the opening direction.

Indeed, the conventional oil damper is capable of braking the opening speed of the ashtray case and causing it to open slowly. Conversely, when the ashtray case is pushed into the frame, the braking force similarly derived from the viscous resistance of the oil is suffered to manifest its effect because of the construction of the oil damper. In this case, the viscous resistance of the oil entails the mischief that the ashtray case cannot be smoothly pushed into the frame.

An attempt to vary the torque of rotation of the rotor necessitates auxiliary means such as, for example, a one-way clutch and, as a result, automatically increases the size of the oil damper. In the worst case, this increase of size possibly renders the oil damper unsuitable for the intended use.

Further, the viscous oil such as silicone oil which is used in the storing chamber is susceptible of the influence of the change of temperature under the working conditions of the oil damper. In the construction in which the braking force is derived exclusively from the viscous resistance of oil as in the conventional oil damper, therefore, the torque of rotation varies in accordance with the temperature variation under the working conditions of the oil damper and the oil damper can no longer be expected to operate stably. Moreover, since the amount of the viscous oil to be placed in the storing chamber is necessarily large, the oil damper entails the disadvantage that the contained oil tends to leak from the oil damper in consequence of thermal expansion of the oil.

Another damper resorting to resilient pressure has been proposed in Japanese Utility Model Publication No. 57-49216.

The prior art damper, though not specifically illustrated herein, differs in idea from the conventional oil damper which makes use of the viscous resistance of oil. Specifically, it has a construction such that a plurality of J-shaped metallic leaf spring members are radially disposed in a rotor set rotatably in place inside a storing chamber of a housing and that the curved leading terminal parts of the J-shaped leaf spring members are kept in direct sliding contact with the inner wall surface defining the storing chamber of the housing. The opening speed of the ashtray case is braked by allowing the leaf spring members to move in company with the rotor thereby adding to the frictional force to be generated between the curved leading terminal parts of the leaf spring members and the inner wall surface of the storing chamber. Conversely, the ashtray case is pressed into the frame by decreasing the frictional force generated between the cured leading terminal parts of the leaf spring members and the inner wall surface of the storing chamber.

The prior art damper, therefore, has absolutely no use for the incorporation of viscous oil and has absolutely no possibility of succumbing to the influence of temperature change or entailing oil leakage. In terms of the convenience of use, the prior art damper is advantageous over the conventional oil damper since it is theoretically capable of varying the torque of rotation by virtue of the direction of rotation of the rotor without requiring use of auxiliary means such as, for example, a one-way clutch.

Since the prior art damper adopts a construction requiring the curved leading terminal parts of the J-shaped leaf spring members to be kept in direct sliding contact with the inner wall surface of the storing chamber, however, it is fated to require the component parts thereof to be highly accurate relative to one another. Only naturally, therefore, the work of assembling the component parts turns out to be very troublesome. In commercial production of the prior art damper, the possibility of the braking force being dispersed among a plurality of products is great. It also has a serious structural disadvantage that the individual leaf spring members, while moving in company with the rotor with the curved leading terminal parts thereof kept in sliding contact with the inner wall surface of the storage chamber, undergo stick slip and, in the worst case, get locked in situ and cease to produce smooth motion.

By this reason, the prior art damper which makes use of this resilient pressure has not been easily reduced to practice from the realistic point of view, though it enjoys the advantage not found in the oil damper.

In the light of the problems encountered by the conventional dampers as described above, the main object of this invention is to provide a rotary oil damper which enables the torque of rotation to be varied in the normal and reverse directions of rotation and defies the influence of temperature change.

SUMMARY OF THE INVENTION

To accomplish the object described above, according to the present invention there is provided a rotary oil damper comprising a housing incorporating therein a storing chamber open on one side, a cap having a hole and for shutting the opening in the storing chamber of the housing, a rotor including a base part and a shaft part and disposed rotatably inside the storing chamber of the housing, the shaft part protruding outwardly through the hole of the cap, a toothed wheel fixed to the shaft part of the rotor, viscous oil filling the storing chamber of the housing, and a ring-shaped leaf spring member having opposite terminal parts separated from each other and contained in conjunction with the rotor inside the storing chamber, with one of the opposite terminal parts fixed to the base part of the rotor, so as to move along an inner wall surface of the storing chamber through a membranous layer of the viscous oil formed between the inner wall surface and a peripheral surface of the ring-shaped leaf spring member synchronously with the normal or reverse rotation of the rotor within the storing chamber.

The above and other objects, features and advantages of this invention will become apparent from the detailed description of the invention to be given below with reference to the accompanying drawings.

DETAILED DESCRIPTION OF THE PREFERRED EMBODIMENT

This invention will now be described below with reference to one embodiment thereof illustrated in the accompanying drawings.

Figure 1:
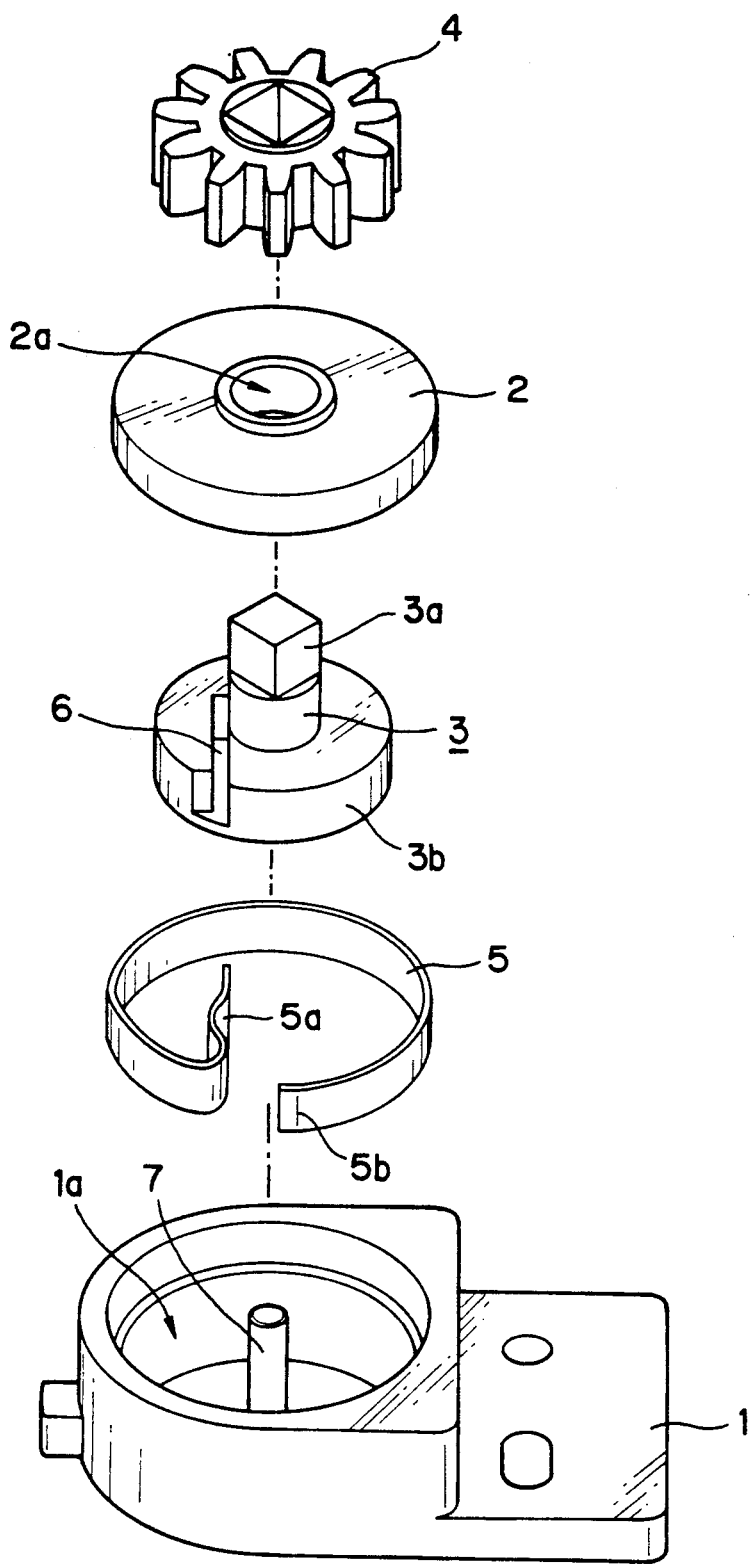
FIG. 1 is an exploded perspective view showing one embodiment of the rotary oil damper according to the present invention.

As illustrated in FIG. 1, the rotary oil damper contemplated by this embodiment comprises a housing 1 incorporating therein a storing chamber 1a open on one side, a cap 2 adapted to shut the opening of the storing chamber 1a of the housing 1, a rotor 3 rotatably disposed inside the storing chamber 1a of the housing 1, and a toothed wheel 4 fixed to a shaft part 3a of the rotor 3 protruding outwardly through a hole 2a of the cap 2, with viscous oil filling the storing chamber 1a of the housing 1 and is characterized in that the braking force aimed at is obtained by organically utilizing the viscous oil and a leaf spring member 5 instead of deriving the braking force exclusively from the viscous resistance of oil or from the resilient pressure of leaf springs as in the conventional dampers.

To be specific, in this embodiment, the leaf spring member 5 is formed of a resilient thin metallic plate as curved in the shape of a ring having the opposite terminal parts 5a and 5b thereof separated from each other as illustrated in the drawing. The terminal part 5a of the leaf spring member 5 is folded roughly in the shape of the letter L so as to be fixed by insertion in a fitting groove 6 formed in the rotor 3 on a dislike base part 3b side, with the result that the terminal part 5a can be fixed to the disklike base part 3b of the rotor 3. The opposite terminal part 5b of the leaf spring member 5 which is placed in a free state inside the storing chamber 1a has the terminal edge thereof folded slightly inwardly. By virtue of this folded shape, the terminal part 5b is allowed to move smoothly along the inner wall surface of the storing chamber 1a.

Figure 2:
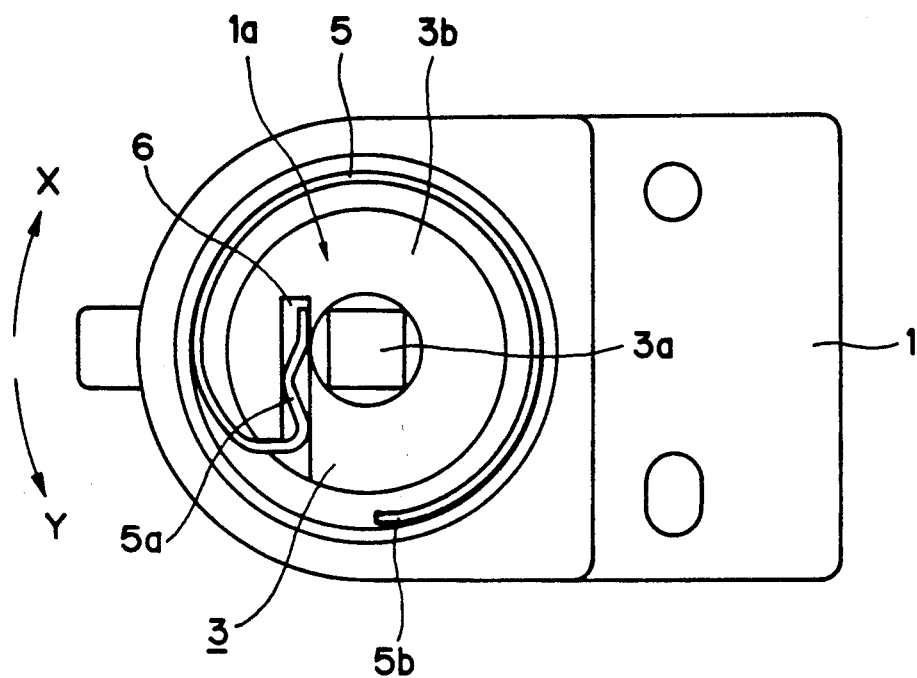
FIG. 2 is a plan view illustrating a ring-shaped leaf spring member of the oil damper in a state disposed in conjunction with a rotor inside a storing chamber of a housing.

In the assemblage of the oil damper of the present embodiment including the leaf spring member 5 of the construction described above, therefore, the one terminal part 5a of the leaf spring member 5 is inserted and fixed in the fitting groove 6 and, with the one terminal part 5a of the leaf spring member 5 kept fixed to the disklike base part 3b of the rotor 3, the rotor 3 is stowed in the storing chamber 1a of the housing 1 in conjunction with the leaf spring member 5. As a result, the rotor 3 is rotatably supported on a supporting part 7 which rises from the inner bottom surface of the storing chamber 1a and the leaf spring member 5 is movably disposed inside the storing chamber 1a in a state such that the peripheral surface thereof contacts the inner wall surface defining the storing chamber 1a as shown in FIG. 2.

Figure 3:
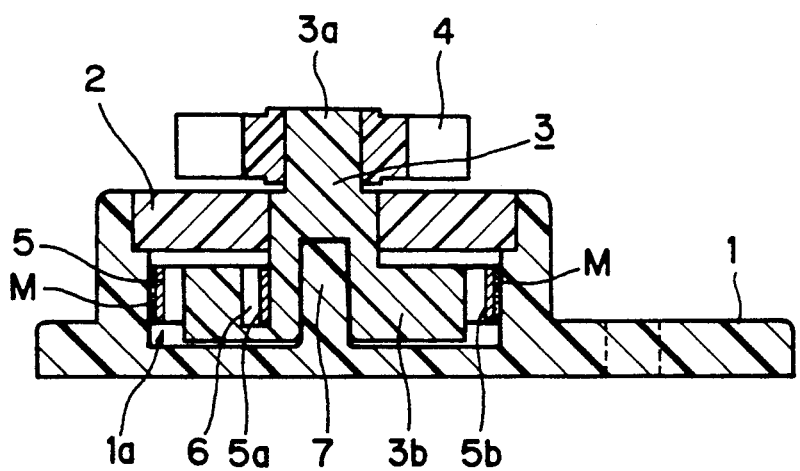
FIG. 3 is a longitudinal cross section illustrating the oil damper in a finally fitted state.

Thereafter, the storing chamber 1a is filled with a required amount of viscous oil (not shown) and then the cap 2 is set in place to shut the opening of the storing chamber 1a as shown in FIG. 3 and the toothed wheel 4 is fixed to the shaft part 3a of the rotor 3 which protrudes outwardly through the hole 2a of the cap 2. The rotary oil damper of the present embodiment whose appearance is not different in any point from the conventional oil damper can be assembled so easily as described above. While the rotary oil damper is in the finally assembled state thus obtained, owing to the viscosity of the oil contained in the storing chamber 1a, this viscous oil is caused to form a membranous layer M interposed between the peripheral surface of the ring-shaped leaf spring member 5 and the inner wall surface of the storing chamber 1a as shown in FIG. 3. Unlike the prior art damper mentioned above, the present rotary oil damper does not allow the peripheral surface of the leaf spring member 5 to come into direct contact with the inner wall surface of the storing chamber 1a.

For the purpose of applying this rotary oil damper to a push-open type ashtray in an automobile, it suffices to fix the housing 1 of the oil damper via the flange part thereof to either of the ashtray case and the frame capable of retaining the ashtray case in an emerging-submerging state, provide a rack for the remainder of the two component parts just mentioned and cause the toothed wheel 4 to be meshed with the rack. In this case, the rotary oil damper is so constructed that the rotor 3 rotates in the direction of X in FIG. 2 when the ashtray case is opened, while the rotor 3 rotates in the direction of Y in FIG. 2 when the ashtray case is pressed into the frame.

In the construction described above, when the ashtray case tends to move in the opening direction by virtue of the resilient pressure, the force of this motion rotates the rotor 3 in the X direction and, at the same time, causes the ring-shaped leaf spring member 5 to move in the same direction synchronously with the rotation of the rotor 3. During this motion of the ring-shaped leaf spring member 5, the ring-shaped leaf spring member 5, while pushing and spreading the one terminal part 5a thereof and assuming a state as though radially expanding the entire volume thereof, strongly presses the peripheral surface thereof against the inner wall surface of the storing chamber 1a and moves smoothly while decreasing the thickness of the membranous layer M of the viscous oil interposed between the surface just mentioned.

During the opening of the ashtray case, therefore, this ashtray case can be opened slowly because the resistance of pressure exerted on the inner wall surface through the membranous layer M on the peripheral surface of the leaf spring member 5 can produce the required braking force.

When the opened ashtray case is pressed into the frame, the pressing force rotates the rotor 3 this time in the Y direction and, at the same time, causes the ring-shaped leaf spring member 5 to move in the same direction as synchronized with the rotation of the rotor 3. During this motion of the ring-shaped leaf spring member 5, contrary to the motion mentioned above, the ring-shaped leaf spring member 5, while causing the one terminal part 5a thereof to approach the other terminal part 5b thereof and assuming a state as though radially contracting the entire volume thereof, effectively alleviates the state of pressure exerted by the peripheral surface on the inner wall surface of the storing chamber 1a, enlarges the gap between the peripheral surface of the leaf spring member 5 and the inner wall surface of the storing chamber 1a, and moves smoothly while increasing the thickness of the membranous layer M of the viscous oil held in the gap.

During the forced insertion of the ashtray case, therefore, the ashtray case can be pressed smoothly with feeble force into the frame because the interposed membranous layer M of the viscous oil increases in thickness and the resistance of pressure exerted by the ring-shaped leaf spring member 5 proportionately decreases in magnitude.

This embodiment, therefore, proves to be greatly advantageous in terms of the convenience of use because the torque of rotation during the normal or reverse rotation of the rotor 3 can be varied easily without requiring use of such auxiliary means as a one-way clutch owing to the adoption of the construction making effective use of both the resilient pressure of the ring-shaped leaf spring member 5 having the opposite terminal parts 5a and 5b thereof separated from each other and the membranous layer M of the viscous oil and further because the ring-shaped leaf spring member 5 can be smoothly moved in the normal or reverse direction without inducing the phenomenon of stick slip or being locked in situ owing to the function of the membranous layer M of the viscous oil.

Since the storing chamber 1a of the housing 1 is filled with the viscous oil, the resistance arising from the viscosity of the oil contributes to the braking operation. In the present embodiment, since the ring-shaped leaf spring member 5 also contributes greatly to the braking operation. As a result, the rotary oil damper of the present embodiment has absolutely no possibility of entailing oil leakage due to thermal expansion of the oil because the amount of the viscous oil to be contained in the storing chamber 1a is small as compared with that required for the conventional oil damper. Moreover, the viscous oil not only warrants smooth motion of the ring-shaped leaf spring member 5 but also functions to prevent the leaf spring member 5 and the inner wall surface of the storing chamber 1a from wear due to friction.

The rotary oil damper of this embodiment and the conventional oil damper were compared by an experiment of exposing them to a rotation at a fixed speed of 200 rpm in the normal or reverse direction at varying temperatures of $-30$, 0, 25 and 80 degrees centigrade and determining the torques of rotation under the varying conditions. The two dampers will be compared below on the basis of the results of this experiment.

Figure 4:
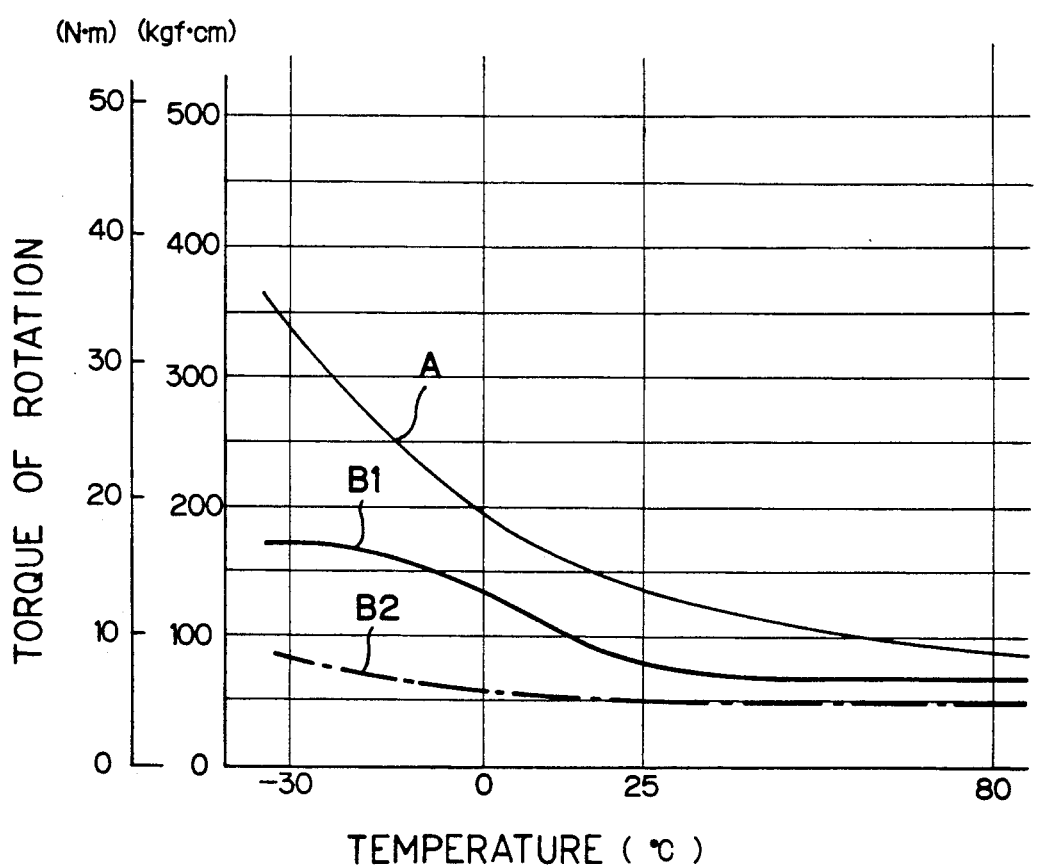
FIG. 4 is a diagram showing a comparison of the oil damper of the present invention and a conventional oil damper in terms of the relation between the temperature and the torque of rotation.

First, in the case of the conventional oil damper which relies exclusively on the resistance arising from the viscosity of the oil, since the magnitude of torque of rotation measured at each of the temperatures mentioned above is equal when the rotation is in the normal direction and when it is in the reverse direction, the characteristic curve of the torque of rotation vs. the temperature is expressed as Curve A in FIG. 4. In the case of the rotary oil damper of the present embodiment, the characteristic curve obtained when the rotation is made in the direction of X in FIG. 2 is expressed as Curve B1 in FIG. 4 whereas that which is obtained when then rotation is made in the direction of Y in FIG. 2 is expressed as Curve B2 in FIG. 4.

Thus, in the conventional oil damper, since the torque of rotation is equal no matter whether the rotation is made in the normal direction or in the reverse direction at any temperature, the ashtray case will eventually cease to be smoothly pressed into the frame. Conversely, in the case of the rotary oil damper of the present embodiment, since variation can be imparted to the torque of rotation when the rotation is made in the normal direction and when it is made in the reverse direction, the ashtray case can be slowly moved in one direction and it can be pressed smoothly into the frame in the other direction.

Further, in the case of the conventional oil damper, as clearly shown in Curve A of FIG. 4 the magnitude of the torque of rotation notably varies with the varying temperature, and the magnitude of the torque of rotation widely differs in the low temperature region and in the high temperature region. In the case of the rotary oil damper of the present embodiment, the magnitude of the torque of rotation in Curve B1 of FIG. 4 is virtually constant in the high temperature region above 25 degrees centigrade in spite of a slight deviation in the low temperature region and the magnitude in Curve B2 of FIG. 4 is substantially constant in the low temperature region through the high temperature region.

The data of the experiment clearly indicate that while the conventional oil damper is highly susceptible of the influence of change in temperature and, therefore, cannot be expected to offer a stable operation, the rotary oil damper of the present embodiment is not easily affected by the influence of change in temperature and, therefore, can be expected to offer a stable operation.

Further, in the present embodiment, when the temperature is low and the viscosity of the oil is consequently heightened, the membranous layer M of the viscous oil which intervenes between the peripheral surface of the leaf spring member 5 and the inner wall surface of the storing chamber 1a has the thickness thereof automatically increased. Conversely, when the temperature is high and the viscosity of the oil is consequently lowered, the membranous layer M of the viscous oil has the thickness thereof automatically decreased. Owing to this phenomenon of increase or decrease in the thickness of the membranous layer M in consequence of the change of temperature, the rotary oil damper of this embodiment is allowed to lower the magnitude of the torque of rotation in the low temperature region and heighten it in the high temperature region.

In the present embodiment, therefore, even when the viscosity of the oil is changed by the temperature prevalent under the working conditions, the rotary oil damper is capable of amply manifesting the function of adjusting the torque of rotation because the membranous layer M of the oil intervening between the peripheral surface of the leaf spring member 5 and the inner wall surface of the storing chamber 1a automatically changes the thickness thereof accordingly. Even from this point of view, the rotary oil damper can be expected to produce a stable operation at all times without being affected by change of temperature.

Incidentally, the embodiment described thus far represents a case of application of the rotary oil damper of this invention to a push-open type ashtray in an automobile. This invention needs not be limited to this particular embodiment but may be applied equally effectively to any member such as, for example, an opening-shutting lid for a household electric appliance which requires application of brakes to the opening speed of the lid. Even in this embodiment, the rotary oil damper can be expected to manifest the same operation and effect as in the preceding embodiment.

Owing to the adoption of the construction described above, the rotary oil damper of this invention is enable to effect easy variation of the torque of rotation in the normal and reverse directions of rotation. When the ashtray case in the automobile is pressed into the frame or when the opening-shutting lid of the household electric appliance is shut, the rotary oil damper of this invention warrants smooth operation as compared with the conventional oil damper.

Moreover, the rotary oil damper of this invention warrants smooth operation as compared with the conventional oil damper.

Moreover, the rotary oil damper of the present invention neither relies exclusively on the resistance arising from the viscosity of the oil as does the conventional oil damper nor directly harnesses the resilient pressure of the leaf spring member as does the prior art damper. Thus, the rotary oil damper is only sparingly susceptible of the influence of change of temperature and the leaf spring member thereof avoids inducing the phenomenon of stick slip or being locked in situ. In any event, the rotary oil damper can be expected to produce a stable operation at all times.

The rotary oil damper of this invention enjoys another advantage in that the magnitude of the torque of rotation generated thereby can be freely fixed by suitably selecting the thickness and diameter of the ring-shaped leaf spring member and the viscosity of the oil and the amount of the oil to be used in the storing chamber.

What is claimed is:

1. A rotary oil damper comprising:
    a housing incorporating therein a storing chamber open on one side;
    a cap having a hole and for shutting the opening in said storing chamber of said housing;
    a rotor including a base part and a shaft part and disposed rotatably inside said storing chamber of said housing, said shaft part protruding outwardly through said hole of said cap;
    a toothed wheel fixed to said shaft part of said rotor;
    viscous oil filling said storing chamber of said housing; and
    a ring-shaped leaf spring member having opposite terminal parts separated from each other and contained in conjunction with said rotor inside said storing chamber, with one of said opposite terminal parts fixed to said base part of said rotor, so as to move along an inner wall surface of said storing chamber through membranous layer of said viscous oil formed between said inner wall surface and a peripheral surface of said ring-shaped leaf spring member synchronously with the normal of reverse rotation of said rotor within said storing chamber.

2. A rotary oil damper according to claim 1, wherein the rotation of said rotor in one direction causes said ring-shaped leaf spring member to expand, thereby decreasing a thickness of said membranous layer and that of said rotor in the opposite direction causes said ring-shaped leaf spring member to contract, thereby increasing the thickness of said membranous layer.

3. A rotary oil damper according to claim 1, wherein said base part of said rotor has a fitting groove formed therein, said one of said opposite terminal parts of said ring-shaped leaf spring member being fitted in said fitting groove and the other terminal part of said ring-shaped leaf spring member being placed in a free state inside said storing chamber and folded slightly inwardly.

4. A rotary oil damper according to claim 3, wherein the rotation of said rotor in one direction causes said ring-shaped leaf spring member to expand, thereby decreasing a thickness of said membranous layer and that of said rotor in the opposite direction causes said ring-shaped leaf spring member to contract, thereby increasing the thickness of said membranous layer.

* * * * *